United States Patent Office 2,919,262
Patented Dec. 29, 1959

2,919,262
PROCESS FOR MAKING POLYSULFIDE LIQUID POLYMERS

William R. Nummy, Midland, Mich., assignor to The Dow Chemical Company, Midland, Mich., a corporation of Delaware No Drawing. Application April 23, 1956
Serial No. 579,773

8 Claims. (Cl. 260—79.1)

This invention concerns a process for making polysulfide liquid polymers. It relates more particularly to a procedure and agents for splitting high polysulfide polymers to obtain polysulfide liquid polymers.

Polysulfide polymers may be divided broadly into two classes (a) the normally solid polymers having molecular weights within the range of from about 15,000 to 200,000 or greater and (b) the normally liquid polymers having molecular weights within the range of from about 500 to 12,000. The normally solid or high polysulfide polymers may be linear, partially cross-linked or completely cross-linked. The liquid polymers can be obtained by splitting the high polymers into lower polymers.

J. C. Jorczak and E. M. Fettes in Ind. and Eng. Chem., vol. 43, pp. 324–328 (1951), make polysulfide liquid polymers by reductive cleavage of disulfide groups in high polysulfide polymers to yield products which have terminal thiol groups. The procedure employed is to treat a water dispersion of a polysulfide polymer with sodium hydrosulfide and sodium sulfite. The sodium hydrosulfide splits a disulfide link to form a thiol and a sodium salt of a thiol, and depending upon the mole ratio of sodium hydrosulfide to polymer repeating segments, liquid polymers of varying molecular weights can readily be prepared. The chemical reactions which occur can be illustrated by the equation:

—R—S—S—R—+NaSH+Na$_2$SO$_3$
→—RSNa+HSR—+Na$_2$S$_2$O$_3$ wherein R represents a skeleton carbon structure of

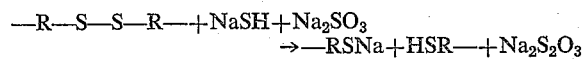

designating adjacent carbon atoms and carbon atoms joined to and separated by intervening structure. The addition of acid to coagulate the liquid polymer water dispersion converts the sodium salt —RSNa to the free thiol.

The disadvantages of carrying out the reductive cleavage of disulfide groups in high polysulfide polymers in a water dispersion and recovering the liquid polymers are apparent.

It has now been discovered that normally solid polysulfide polymers of high molecular weight can readily be split or converted to polymers of lower molecular weight having reactive thiol or mercapto terminal groups by treating the high polysulfide polymers with polythiols, e.g. dithiols, trithiols, tetrathiols, etc. as hereinafter described.

The polythiols employed according to the invention in effecting the reductive cleavage of the disulfide groups in the high polysulfide polymers to yield polysulfide liquid polymers, enter into and become an integral part of the liquid product or the rubbery polysulfide polymers obtained by subsequent curing or oxidation of the liquid product. The invention provides an improved process for making polysulfide liquid polymers from high molecular weight solid polysulfide polymers.

Any polythiol containing two or more mercapto groups in the molecule, e.g. dithiols, trithiols, tetrathiols, etc., can be employed to effect reductive cleavage of disulfide groups in high polysulfide polymers to yield products which have terminal thiol groups. The polythiols are preferably aliphatic thiols containing from 2 to 4 thiol groups in the molecule such as polythiols having the general formula HSR(SH)$_x$ wherein R is a radical selected from the group consisting of

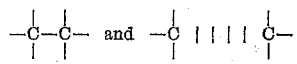

designating respectively adjacent carbon atoms and carbon atoms joined to and separated by intervening structure and $x$ is a whole number from 1 to 3. Suitable dithiols having the above mentioned general formula are shown in the following Table I.

TABLE I

HSCH$_2$CH$_2$SH
HSCH$_2$CH$_2$CH$_2$SH

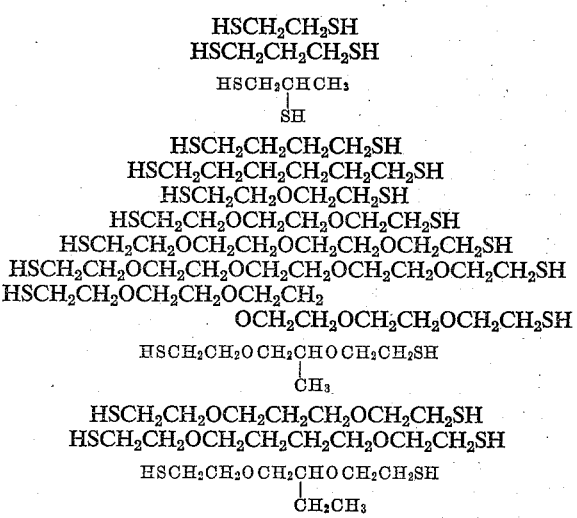

Suitable tri- and tetramercapto compounds are shown in the following Table II.

TABLE II

HSCH$_2$CHCH$_2$SH
|
SH

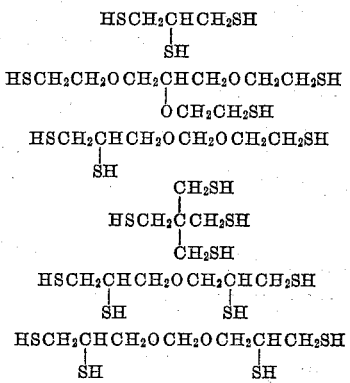

Among the polythiols having the above general formula the polythiols having from 2 to 3 mercapto groups in the molecule are preferred. Such polythiols include tetramethylenedithiol-1,4, hexamethylenedithiol-1,6, 1,2,3-trimercaptopropane, 2,2'-oxy-dipropanethiol, 1,2,3-oxytripropanethiol, 1,3-oxydipropanethiol, and dithiols having the general formula:

wherein $n$ and $m$ independently represent an integer from 1 to 4.

The polythiols having the above general formula can be employed to split or effect the reductive cleavage of disulfide groups in any of the polysulfide polymers of high molecular weight to yield products which have terminal thiol groups. The higher molecular weight polysulfide polymers can be those prepared by the reaction of organic dihalides and sodium polysulfide such as are described in Ind. Eng. Chem., vol 28, pp. 1145–1149 (1936), or polysulfide polymers of high molecular weight prepared by the oxidation of one or more polythiols having the above general formula.

In practice, for the preparation of polysulfide liquid polymers, the normally solid polysulfide polymers are mixed with one or more of the polythiols in proportions corresponding to from 2.5 to 100 parts by weight of the polythiol per 100 parts of the solid polysulfide polymer. The reaction which occurs readily at room temperature or thereabout can be carried out at temperatures between 20° and 220° C., preferably from 20° to 120° C., and at atmospheric or substantially atmospheric pressure. The reaction is usually carried out with stirring of the ingredients in admixture with one another and with limited access of air or oxygen by way of a reflux condenser to the reactants, or carrying out of the reaction under an atmosphere of an inert gas, e.g. nitrogen or helium, until a uniform liquid composition is obtained. Upon conversion of the mixture of starting materials to a smooth syrup or uniform liquid, the resulting polysulfide liquid polymer is suitable for use without further treatment or purification.

The molecular weight of the polysulfide liquid polymers can be varied over a wide range depending for the most upon the relative proportions of the solid high molecular weight polysulfide polymer and the polythiol or polythiols employed. An increase in proportion of the polythiol relative to the polysulfide to be reacted therewith results in a decrease in the average molecular weight of the product. In general when employing a solid polysulfide polymer such as that prepared by reaction of dichlorodiethyl formal and sodium sulfide as starting material and 2,2'-oxybis-(ethyleneoxy)diethanethiol in proportions of from 2.5 to 100 parts by weight of the dithiol per 100 parts by weight of the polysulfide polymer, liquid products having absolute viscosities between about 500 and 100,000 centipoises at 25° C. are obtained. By employing a mixture of a dithiol and a tri- or tetrathiol, polysulfide liquid polymers are obtained which are capable of being cured or oxidized to form cross-linked polysulfide polymers that are insoluble in usual organic solvents for linear polysulfide polymers.

The polysulfide liquid polymers prepared as herein described can all be cured or vulcanized by suitable treatment with oxidizing agents such as oxygen, organic peroxides, metallic oxides, etc., in admixture with a small amount, e.g. from 1 to 10 percent by weight, of a tri- or tetrathiol as cross-linking agent, to form tough rubbery compositions which are suitable for a variety of applications.

The following examples illustrate ways in which the principle of the invention has been applied, but are not to be construed as limiting its scope.

*Example 1*

A. A charge of 50 grams of 2,2'-oxybis-(ethyleneoxy)diethanethiol of the formula

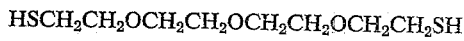

was added with stirring to 500 cc. of water containing 25 grams of potassium hydroxide. A clear solution was obtained. The solution was stirred and 36 cc. of an aqueous 1.05-normal sodium hypochlorite solution was added over a period of 30 minutes. A white rubbery polymer was precipitated. The polymer was separated by filtering and was washed with water and dried. The product was a clear rubbery polysulfide polymer. It was soluble in chloroform and in toluene.

B. A charge of 7 parts by weight of the rubbery polysulfide polymer prepared in part A above was mixed with 1 part by weight of 2,2'-oxybis-(ethyleneoxy)diethanethiol. The mixture was stirred at room temperature over a period of 48 hours. The product was a syrupy liquid polysulfide polymer having an absolute viscosity of 3200 centipoises at 25° C. The liquid polysulfide polymer was mixed with one percent by weight of 1,2,3-trimercaptopropane and 8 parts of C–5 Cure, a mixture of 50 percent by weight of $PbO_2$, 45 percent of dibutyl phthalate and 5 percent of stearic acid. It cured to a tough rubbery polysulfide polymer at room temperature.

*Example 2*

A charge of 20 parts by weight of a rubbery polysulfide polymer similar to that prepared in part A of Example 1 was mixed with 1 part of 2,2'-oxybis-(ethyleneoxy)diethanethiol. The mixture was stirred at room temperature over a period of 72 hours. The product was a liquid having an absolute viscosity of 50,000 centipoises at 25° C.

*Example 3*

A charge of 7 parts by weight of a solid polysulfide polymer similar to that prepared in part A of Example 1, was mixed with 1 part of 2,2'-oxybis-(ethyleneoxy)-diethanethiol. The mixture was stirred and heated at temperatures between 95° and 97° C. over a period of 2 hours. The product was a polysulfide liquid polymer having a viscosity of approximately 3200 centipoises at 25° C.

*Example 4*

A charge of 7 parts by weight of a solid polysulfide polymer, prepared by oxidizing 2,2'-ethylenebis-(oxyethyleneoxy)diethanethiol by procedure similar to that described in part A of Example 1, was mixed with 1 part by weight of the same dithiol. The mixture was stirred at room temperature over a period of 48 hours. The product was a liquid polysulfide polymer.

*Example 5*

A charge of 7 parts by weight of a solid polysulfide polymer, prepared by oxidizing 2,2'-oxydiethanethiol by procedure similar to that employed in part A of Example 1, was mixed with 1 part by weight of 2,2'-oxybis-(ethyleneoxy)diethanethiol. The mixture was stirred at room temperature over a period of 48 hours. The product was a smooth syrup.

*Example 6*

A charge of one part by weight of 2,2'-oxydiethanethiol was heated to boiling, i.e. 217° C., at atmospheric pressure. Thereafter, 7 parts by weight of a solid polysulfide polymer similar to that prepared in part A of Example 1, was added. The mixture was stirred and heated at temperatures between 217° and 220° C. under an atmosphere of nitrogen for a period of 15 minutes, then was cooled. The product was a liquid syrup at room temperature.

*Example 7*

A charge of 7 parts by weight of a solid polysulfide polymer similar to that prepared in part A of Example 1, was mixed with one part by weight of 2,2'-oxybis-(ethyleneoxy)ethanethiol and 0.4 part of 1,2,3-trimercaptopropane. The mixture was stirred at room temperature over a period of 48 hours. The product was a smooth pourable liquid.

*Example 8*

A charge of 7 parts by weight of a rubbery polysulfide polymer, prepared by oxidizing a mixture of 95 percent by weight of 2,2'-oxybis-(ethyleneoxy)diethanethiol and 5 percent of 1,2,3-trimercaptopropane, employing procedure similar to that employed in part A of Example 1, was mixed with one part of 2,2'-oxybis-(ethyleneoxy)diethanethio. The mixture was stirred at room temperature over a period of 48 hours. The product was a liquid polysulfide polymer. It could be cured by treatment with lead dioxide to yield a solid rubbery polysulfide polymer.

Example 9

A charge of 10 parts by weight of a solid rubbery polysulfide polymer similar to that prepared in part A of Example 1, was mixed with one part of hexamethylene dithiol, $HS(CH_2)_6SH$. The mixture was agitated at room temperature over a period of 6 hours. The product was a uniform polysulfide liquid polymer.

Example 10

A. A charge of 3.4 grams of hexamethylene dithiol was dissolved in 100 cc. of an aqueous solution containing 2.5 grams of potassium hydroxide. A charge of 3.6 cc. of an aqueous 1.05-normal solution of sodium hypochlorite was added with stirring. A solid polymer was formed. The polymer was separated, washed with water and dried. The product was a hard waxy polysulfide polymer.

B. Six parts by weight of a hard waxy polysulfide polymer of hexamethylenedithiol, prepared by procedure similar to that described in part A above, was mixed with one part of hexamethylenedithiol. The mixture was allowed to stand at room temperature for a period of six hours. A clear liquid solution was obtained.

Example 11

A. To 2.4 liters of an aqueous 2-molar solution of sodium disulfide there was added one gram of Nekal BX, a sodium alkyl naphthalene sulfonate wetting agent, and 12.8 grams (0.32 mole) of sodium hydroxide. The mixture was stirred and 14.35 (0.16 mole) of magnesium chloride was added as an aqueous 25 weight percent solution of the same. Thereafter, 692 grams (4.0 moles) of beta-chloroethyl formal, $CH_2(OCH_2CH_2Cl)_2$, was added over a period of one hour while maintaining the mixture at temperatures between 90° and 95° C. The mixture was stirred and heated at a temperature of 100° C. for a period of one hour longer, then cooled. The finely divided dispersion of polymer was washed until free from sodium sulfide and sodium chloride. The polymer was dispersed in water and the aqueous solution made acidic with hydrochloric acid to coagulate the polymer to a larger crumb. The coagulated polysulfide polymer was separated, washed with water and dried. The product was a rubbery solid. It was soluble in chloroform and toluene.

B. A charge of 7 grams of the rubbery polysulfide polymer, prepared in part A above, was mixed with 1 gram of 2,2'-oxybis-(ethyleneoxy)diethanethiol. The mixture was agitated at room temperature for a period of 24 hours. A clear syrupy liquid was obtained.

I claim:

1. A process for effecting the reductive cleavage of disulfide groups in normally solid high molecular weight polysulfide polymers to yield liquid products having terminal thiol groups, which process comprises reacting a mixture comprising a normally solid polysulfide polymer containing a plurality of disulfide groups of the formula —R—S—S—R—, wherein R represents a radical of the group consisting of —$C_nH_{2n}$—, wherein $n$ is an integer from 2 to 6, —$CH_2CH_2OCH_2CH_2$—, and —$CH_2CH_2O(C_nH_{2n}O)_mCH_2CH_2$— wherein $n$ and $m$ independently represent an integer from 1 to 4, said normally solid polysulfide polymer being a member of the group consisting of (1) polymers prepared by oxidizing an aliphatic polythiol containing from 2 to 4 thiol groups, separated from one another by R groups as defined above, in the molecule, whereby at least a portion of the thiol groups are condensed to form disulfide groups of the formula —R—S—S—R—, wherein R is a radical of the group defined above, and (2) polymers prepared by reaction of an organic aliphatic dihalide and sodium polysulfide, and from 0.025 to 1 part by weight per part of the polysulfide polymer of at least one aliphatic polythiol selected from the group consisting of (A) polythiols having the general formula $HSR(SH)_x$ wherein R represents an alkylene radical containing from 2 to 6 carbon atoms and $x$ is a whole number from 1 to 3, and (B) polythiols having the general formula $HSCH_2CH_2O(C_nH_{2n}O)_mCH_2CH_2SH$ wherein $n$ and $m$ independently represent an integer from 1 to 4, at temperatures between 20° and 220° C. whereby a uniform liquid composition is obtained.

2. A process as claimed in claim 1, wherein the reaction is carried out at temperatures between 20° and 120° C.

3. A process as claimed in claim 2, wherein the polythiol is a dithiol having the general formula:

$HSCH_2CH_2O(C_nH_{2n}O)_mCH_2CH_2SH$ wherein $n$ and $m$ independently represent an integer from 1 to 4.

4. A process as claimed in claim 3, wherein the polythiol is 2,2'-ethylenebis-(oxyethyleneoxy)diethanethiol.

5. A process as claimed in claim 3, wherein the polythiol is 2,2'-oxybis-(ethyleneoxy)diethanethiol.

6. A process as claimed in claim 5, wherein the polysulfide polymer is the solid reaction product of dichlorodiethyl formal and sodium polysulfide.

7. A process as claimed in claim 5, wherein the polysulfide polymer is the solid polymer resulting from the oxidation of at least one polythiol selected from the group consisting of (A) polythiols having the general formula $HSR(SH)_x$ wherein R represents an alkylene radical containing from 2 to 6 carbon atoms and $x$ is a whole number from 1 to 3, and (B) polythiols having the general formula $HSCH_2CH_2O(C_nH_{2n}O)_mCH_2CH_2SH$ wherein $n$ and $m$ independently represent an integer from 1 to 4.

8. A process for effecting the reductive cleavage of disulfide groups in normally solid high molecular weight polysulfide polymers, which process comprises reacting a mixture of a solid polysulfide polymer, prepared by the reaction of dichlorodiethyl formal and sodium polysulfide, and from 0.025 to 1 part by weight per part of the polysulfide polymer of a mixture of 2,2'-oxybis-(ethyleneoxy)-diethanethiol and 1,2,3-trimercaptopropane, at temperatures between 20° and 120° C., whereby a uniform liquid composition is obtained.

References Cited in the file of this patent

UNITED STATES PATENTS

| | | |
|---|---|---|
| 2,454,099 | Signaigo | Nov. 16, 1948 |
| 2,474,859 | Perkins | July 5, 1949 |
| 2,606,173 | Fettes | Aug. 5, 1952 |